United States Patent [19]
Sasaki

[11] Patent Number: 4,594,512
[45] Date of Patent: Jun. 10, 1986

[54] IONIZATION TYPE SMOKE DETECTOR

[75] Inventor: Toru Sasaki, Tokyo, Japan

[73] Assignee: Nohmi Bosai Kogyo Co. Ltd., Tokyo, Japan

[21] Appl. No.: 573,923

[22] PCT Filed: Jun. 7, 1983

[86] PCT No.: PCT/JP83/00187

§ 371 Date: Jan. 10, 1984

§ 102(e) Date: Jan. 10, 1984

[87] PCT Pub. No.: WO83/04449

PCT Pub. Date: Dec. 22, 1983

[30] Foreign Application Priority Data

Jun. 7, 1982 [JP] Japan ............................ 57-83510[U]

[51] Int. Cl.[4] ............................................ G01T 1/18
[52] U.S. Cl. .................................... 250/384; 250/385
[58] Field of Search ............... 250/381, 382, 384, 385; 340/579, 628, 629

[56] References Cited

U.S. PATENT DOCUMENTS 4,336,455 6/1982 Bryant ................................ 250/381
4,361,763 11/1982 Bryant et al. ....................... 250/381

*Primary Examiner*—Janice A. Howell
*Attorney, Agent, or Firm*—Werner W. Kleeman

[57] ABSTRACT

An ionization type smoke detector for fire alarm comprises an inner ionization chamber (a) defined by an inner electrode (6) and an intermediate electrode (8), an outer ionization chamber (b) defined by the intermediate electrode (8) and an outer electrode (11), and a single radioactive source (3) for ionizing air present in both ionization chambers (a; b). In this type of an ionization type smoke detector, for the purpose of protecting the radioactive source from contamination on one hand and assuring on the other hand that smoke positively supplied to the smoke detector for operational testing is promptly dispelled from the detector upon completion of the test so that the detector can be rapidly restored to the normal operating state, the radioactive source (3) is enclosed by the inner electrode (6), a substrate (1) and an annular wall (2), while the intermediate electrode (8) is supported by a plurality of studs (9) extending from the substrate (1). Openings (7; 10) are provided in the inner electrode (6) and the intermediate electrode (8), respectively, whereby the inner and outer ionization chambers (a; b) are irradiated with radioactive ray emitted by the radioactive source (3) by way of the openings (7; 10).

3 Claims, 2 Drawing Figures

IONIZATION TYPE SMOKE DETECTOR

BACKGROUND OF THE INVENTION

The present invention relates to a new and improved construction of an ionization type smoke detector having a single radioactive source.

The hitherto known ionization type smoke detectors may be classified into two categories. One such category encompasses two-radioactive source type smoke detector composed of an outer ionization chamber for measurement into which smoke can freely flow and an inner ionization chamber for comparison or reference into which no smoke can flow. Each of the ionization chambers is provided with a radioactive source. The other category encompasses single-radioactive-source type ionization smoke detectors in which an intermediate electrode partitioning the two ionization chambers has a small hole formed therein through which the outer ionization chamber is irradiated by a radioactive source disposed in the inner ionization chamber. The single-radioactive-source type smoke detector has advantages over the two-radioactive-source type smoke detector in that its structure is simplified and that a reduced amount of radioactive-energy is sufficient for operation of the smoke detector. However, operational tests of actual smoke detectors of the single-radioactive-source type have shown that there are disadvantages due to the structure which makes it difficult for smoke to flow into the inner ionization chamber through the small hole. Smoke which has once entered the outer ionization chamber is also difficult to be withdrawn therefrom and prevents the smoke detector from being rapidly restored to the initial or normal state. As an attempt to overcome the difficulty mentioned above, there has been made a proposal according to which the hole or opening formed in the intermediate electrode is enlarged in size while the ionization current flowing through the inner ionization chamber is maintained in a saturated state so that the resistance value of the inner ionization chamber remains invariable independent of smoke flowing therein. In this structure of the single-radioactive-source smoke detector, however, the radioactive source disposed within the inner ionization chamber is constantly exposed to the atmosphere, resulting in the radioactive source being subjected to contamination which, in turn, gives rise to changes in the ionization current and hence erroneous operation as well as generation of false alarms.

SUMMARY OF THE INVENTION

With the foregoing in mind, it is an object of the present invention to provide an ionization type smoke detector having a single radioactive source which is configured such that the radioactive source is difficult to be contaminated and that smoke supplied to the detector during operational tests thereof is promptly dispelled upon completion of the test, whereby the detector is rapidly restored to the initial or normal state.

BRIEF DESCRIPTION OF THE DRAWINGS

The invention will be better understood and objects other than those set forth above will become apparent when consideration is given to the following detailed description thereof. Such description makes reference to the annexed drawings wherein throughout the various figures of the drawings there have been generally used the same reference characters to denote the same of analogous components and wherein.

DETAILED DESCRIPTION OF THE PREFERRED EMBODIMENTS

Figure 1:
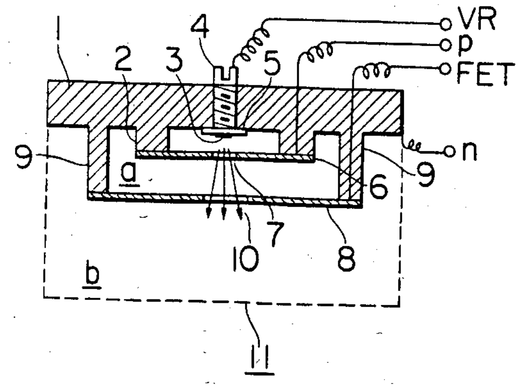
FIG. 1 is a partially sectional view of an exemplary embodiment of the ionization type smoke detector.
Figure 2:
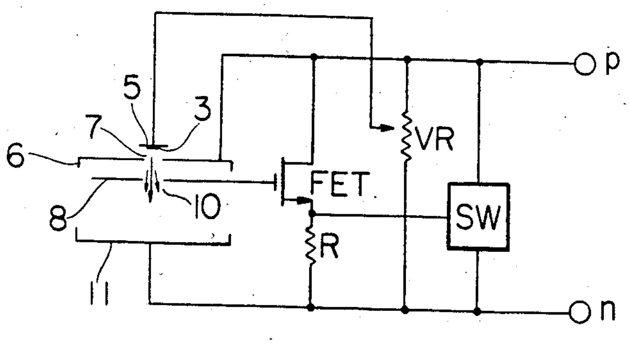
FIG. 2 is an electric circuit diagram of the ionization type smoke detector shown if FIG. 1.

Describing now the drawings, it is to be understood that to simplify the showing thereof only enough of the structure of the apparatus of the invention has been illustrated therein as is needed to enable one skilled in the art to readily understand the underlying principles and concepts of this invention. Turning attention now to FIG. 1 of the drawings, there has been illustrated in sectional view an exemplary embodiment of the inventive ionization type smoke detector and in FIG. 1 reference numeral 1 denotes a substrate carrying thereon electric circuits and the like and reference numeral 2 denotes a ring-like or annular wall provided on the lower surface of the substrate 1. In FIGS. 1 and 2, reference numeral 3 denotes a radioactive source disposed on a member or electrode 5 and whose perpendicular position relative to the substrate 1 can be adjusted by a screw 4, shown in FIG. 1. In FIGS. 1 and 2 reference numeral 6 denotes a disc-like inner electrode disposed on the ring-like or annular wall or wall member 2, reference numeral 7 denotes an opening or orifice of small size provided in the disc-like inner electrode 6 at the center thereof and reference numeral 8 denotes a disc-like intermediate electrode extending parallel with the inner electrode 6 and supported by a plurality of studs 9 which are shown in FIG. 1. In FIGS. 1 and 2 reference numeral 10 denotes an opening or aperture provided in the disc-like intermediate electrode 8 at the center thereof, and reference numeral 11 denotes a mesh-like outer electrode mounted on the substrate 1 shown in FIG. 1 so as to cover or enclose the disc-like inner and intermediate electrodes 6 and 8.

An inner ionization chamber a shown in FIG. 1 is defined between or bounded by the disc-like inner electrode 6 and the disc-like intermediate electrode 8. An outer ionization chamber b also shown in FIG. 1 is defined between the disc-like intermediate electrode 8 and the mesh-like outer electrode 11. Ionizing radiation is emitted by the radioactive source 3 into the ionization chambers a and b through the openings 7 and 10 which are aligned coaxially with the radioactive source 3, in order to thereby ionize air within the ionization chambers a and b.

The disc-like inner electrode 6 is electrically connected to a terminal p of positive polarity of the detector. The mesh-like outer electrode 11 is connected to a negative or minus terminal n. The disc-like intermediate electrode 8 is connected to a gate electrode of a field effect transistor FET which, in turn, is connected between the terminals p and n through a resistor R. Furthermore, the electrode 5 is electrically connected to a movable contact or tap of a variable resistor VR connected between the plus terminal p and the minus terminal n. The source electrode of the FET is connected to a switching circuit SW connected between the plus terminal p and the minus terminal n. The inner ionization chamber a is supplied with a voltage of such magnitude that an ionization current flow is maintained in the saturated state within the chamber a.

The operation of the smoke detector will now be described. In a normal state of the smoke detector, air flow carrying dust is constantly flowing in and out of the ionization chambers a and b due to the air circulation prevailing within a room in which the smoke detector is installed, because the disc-like intermediate electrode 8 is only supported by a plurality of discrete studs 9. Since the radioactive source 3 is essentially enclosed by the disc-like inner electrode 6 and the ring-like or annular wall 2, the radioactive source 3 is protected from exposure to the air flow and thus kept in a clean state notwithstanding the opening or orifice 7 of small size formed in the disc-like inner electrode 6.

When smoke from a fire enters the smoke detector, the ionization current flow in the outer ionization chamber b is decreased. Consequently there increases the gate potential of the FET in order to ultimately actuate the switching circuit SW for indicating the occurrence of a fire when the FET gate potential has attained a predetermined voltage.

For testing the smoke detector, the latter is actually supplied with smoke by using a smoke generating tester. In this case, when the smoke generating tester is moved away from the smoke detector at the end of the test, smoke present in the inner ionization chamber a and the outer ionization chamber b is readily dispelled from these ionization chambers and, carried by the air circulating in the room, since the ionization chambers a and b are freely accessible for the air. Thus, the smoke detector is rapidly restored to a normal state at the end of the test. Furthermore, by varying the potential of the electrode 5 on which the radioactive source 3 is mounted, with the aid of the variable resistor VR, the potential of the disc-like intermediate electrode 8 is correspondingly changed, whereby the sensitivity of the smoke detector can be readily changed.

By means of the structure of the ionization type smoke detector according to the invention and which operates in the manner described above, the radioactive source 3 can be satisfactorily protected against contamination. Furthermore, when smoke is actually applied to the smoke detector for the purpose of operational testing etc., the detector is readily cleaned of smoke at the end of the test in order to be rapidly restored to the initial or normal state. Thus, there has been provided an ionization type smoke detector having a single radioactive source which exhibits advantageous effects over the prior art.

While there are shown and described present preferred embodiments of the invention, it is to be distinctly understood that the invention is not limited thereto, but may be otherwise variously embodied and practiced within the scope of the following claims, accordingly

I claim:

1. An ionization type smoke detector comprising:
- an inner electrode containing an opening;
- an intermediate electrode containing an opening;
- an inner ionization chamber;
- said inner electrode and said intermediate electrode bounding said inner ionization chamber;
- an outer electrode;
- an outer ionization chamber;
- said intermediate electrode and said outer electrode bounding said outer ionization chamber;
- a single radioactive source for ionizing air present in both said inner and said outer ionization chambers;
- a substrate containing a wall member supporting said inner electrode;
- said radioactive source being enclosed by said inner electrode, said substrate and said wall member of said substrate;
- a member adjustable relative to said substrate;
- said radioactive source being disposed on said member; and
- said inner and said outer ionization chambers being irradiated by ionizing radiation emitted by said radioactive source through said openings of said inner and intermediate electrodes emitted by said radioactive source.

2. The ionization type smoke detector as defined in claim 1, wherein:
- said adjustable member on which said radioactive source is disposed constitutes an electrode.

3. The ionization type smoke detector as defined in claim 2, further including:
- a variable resistor;
- said electrode constituted by said member and said intermediate electrode being connected to said variable resistor; and
- said electrode and said intermediate electrode being chargeable to a variable potential by means of said variable resistor in order to vary the sensitivity of the ionization type smoke detector.

* * * * *